(12) United States Patent
Tsuji

(10) Patent No.: US 12,451,205 B2
(45) Date of Patent: Oct. 21, 2025

(54) FUSE MEMORY CIRCUIT

(71) Applicant: ROHM CO., LTD., Kyoto (JP)

(72) Inventor: Masanobu Tsuji, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 124 days.

(21) Appl. No.: 18/396,118

(22) Filed: Dec. 26, 2023

(65) Prior Publication Data

US 2024/0136004 A1 Apr. 25, 2024
US 2024/0233845 A9 Jul. 11, 2024

Related U.S. Application Data

(63) Continuation of application No. PCT/JP2022/024376, filed on Jun. 17, 2022.

(30) Foreign Application Priority Data

Jun. 28, 2021 (JP) .................. 2021-107096

(51) Int. Cl.
*G11C 17/00* (2006.01)
*G11C 17/16* (2006.01)

(52) U.S. Cl.
CPC .................. *G11C 17/165* (2013.01)

(58) Field of Classification Search
CPC ....... G11C 29/50; G11C 29/02; G11C 29/027; G11C 29/50008; G11C 16/04; G11C 16/08; G11C 16/102; G11C 16/12; G11C 16/26; G11C 16/3436; G11C 16/3445; G11C 16/3459; G11C 17/16; G11C 17/18; G11C 2029/5004; G11C 2029/5006; G11C 29/028; G11C 29/50004; G11C 5/145; G11C 16/00

See application file for complete search history.

(56) References Cited

U.S. PATENT DOCUMENTS 5,952,833 A * 9/1999 Morgan .................. G01R 15/09
327/527

FOREIGN PATENT DOCUMENTS

JP 2005085980 A 3/2005

OTHER PUBLICATIONS

International Preliminary Report on Patentability for International Application No. PCT/JP2022/024376, issued Dec. 14, 2023 and PCT International Search Report and Written Opinion from corresponding International Application No. PCT/JP2022/024376; dated Aug. 23, 2022; 15 pages.

* cited by examiner

*Primary Examiner* — Thong Q Le
(74) *Attorney, Agent, or Firm* — CANTOR COLBURN LLP

(57) ABSTRACT

A first fuse unit and a second fuse unit each have the same configuration. A rectification element is coupled in parallel with a fuse element. A first transistor has its drain coupled to a second end of the fuse element, its source coupled to a second line, and its gate coupled to a program terminal. A second transistor has its source coupled to the second end of the fuse element, its drain coupled to the output terminal, and its gate coupled to the test terminal. A third transistor has its drain coupled to the output terminal, and its source coupled to the second line.

10 Claims, 16 Drawing Sheets

FUSE MEMORY CIRCUIT

CROSS REFERENCE TO RELATED APPLICATIONS

This application is a continuation under 35 U.S.C. § 120 of PCT/JP2022/024376 filed Jun. 17, 2022, which is incorporated herein by reference, and which claimed priority to Japanese Application No. 2021-107096, filed Jun. 28, 2021. The present application likewise claims priority under 35 U.S.C. § 119 to Japanese Application No. 2021-107096, filed Jun. 28, 2021, the entire content of which is also incorporated herein by reference.

BACKGROUND

1. Technical Field

The present disclosure relates to a fuse memory circuit.

2. Description of the Related Art

As a technique for adjusting the characteristics or changing the configuration of various kinds of semiconductor apparatuses after manufacturing, trimming is known. As such a trimming technique, a method for trimming in a continuous (analog) manner and a method for trimming in a discrete (digital) manner are known. In recent years, digital trimming, which has an advantage from the viewpoint of cost, is preferably employed.

Reasons why digital trimming has a cost advantage include ease of use of a highly area-efficient digital circuit by means of miniaturization and the fact that excess test flows such as laser trimming are not required.

Furthermore, the trimming value can be handled as a deterministic value. This provides an advantage of allowing function switching and an advantage of allowing a redundant circuit to be turned on or off so as to restore a defective product, thereby providing improved yield, which are reasons why digital trimming is preferably employed.

As a method for digital trimming, the following methods are known.
  Nonvolatile memory (EEPROM, Flash memory, FeRAM, MRAM, PRAM, etc.)
  Fuses (polysilicon fuses, metal wiring fuses)
  Antifuses (Zener zapping, gate oxide film breakdown)

Such methods have both advantages and disadvantages. Accordingly, an optimum method is selected according to the usage. However, it cannot be said that such conventional trimming satisfies all the required design specifications. In some cases, usage under some kind of restriction is unavoidable.

Problems in the nonvolatile memory method

This method requires an additional process, leading to an increased cost. Furthermore, in a case in which a storage element itself or a latch circuit is exposed to noise or radiation, this is a cause of soft error. This requires a countermeasure by a refresh or an error correction circuit. Accordingly, the nonvolatile memory method is unsuitable for an analog IC.

Moreover, in some cases, this method involves poor environmental resistance performance under a particular condition such as a short memory retention life, data loss due to heat, or the like.

With an arrangement including flash memory or the like that requires a peripheral circuit, in a case in which the flash memory or the like has a small storage capacity, such an arrangement cannot provide an advantage of scale. That is to say, this method is not suitable for trimming on the order of several bits to several dozen bits.

In addition, this method requires an initialization and reading operation. Accordingly, this method cannot be employed for a usage requiring a value that must be decided immediately after the power supply is turned on.

Accordingly, a fuse memory circuit employing a fuse or antifuse (which will be collectively referred to as a "fuse element" hereafter) is employed for the following usages.
  Analog or mixed-signal ICs (Integrated Circuits) without reset/enable functions.
  Products having a redundant circuit for defective product restoration.
  Usages for allowing the same die to be evolved into different products by switching a function thereof
  General usages for changing conditions in a programmable manner to be used when the power supply is turned on such as change of a reset voltage of a Power On Reset (POR) circuit, change of a startup sequence among different power supplies, etc.

Such a fuse memory circuit requires the following characteristics.
  No preliminary operation is required. No reading operation/initialization operation is required (i.e., no power-on reset is required).
  High noise resistance.
  That is to say, automatic restoration to a normal state is required in the case of data corruption (soft error) occurring due to an external disturbance.
  Small steady-state current. It is preferable to reduce the steady-state current to substantially zero (i.e., to only leakage current) regardless of whether a fuse element is disconnected or not disconnected.
  Low cost.
  In order to provide a low cost, a fuse memory circuit is preferably designed with a small circuit area, a small number of pins, a low test cost, and a small number of layers.
  Wide operation voltage range.
  Specifically, it is required to be capable of operating in an operation voltage range with a sufficient margin with respect to the operating ranges of all the circuits to be controlled other than the fuse memory circuit.
  High portability.
  That is to say, the fuse memory circuit is preferably designed to require no peripheral circuit for complicated control or testing.
  Testability.
  The fuse memory circuit is preferably designed to support virtual trimming before programming and to support detection of a fault before and after programming.
  High reliability.
  Specifically, the fuse memory circuit is preferably designed to have semipermanent data retention characteristics, high environmental resistance performance (heat, radiation), and high electrostatic discharge breakage resistance.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a diagram showing an output waveform of the fuse memory circuit shown in FIG. 1 after programming when the power supply is turned on.

DETAILED DESCRIPTION

Outline of Embodiments

Figure 1:
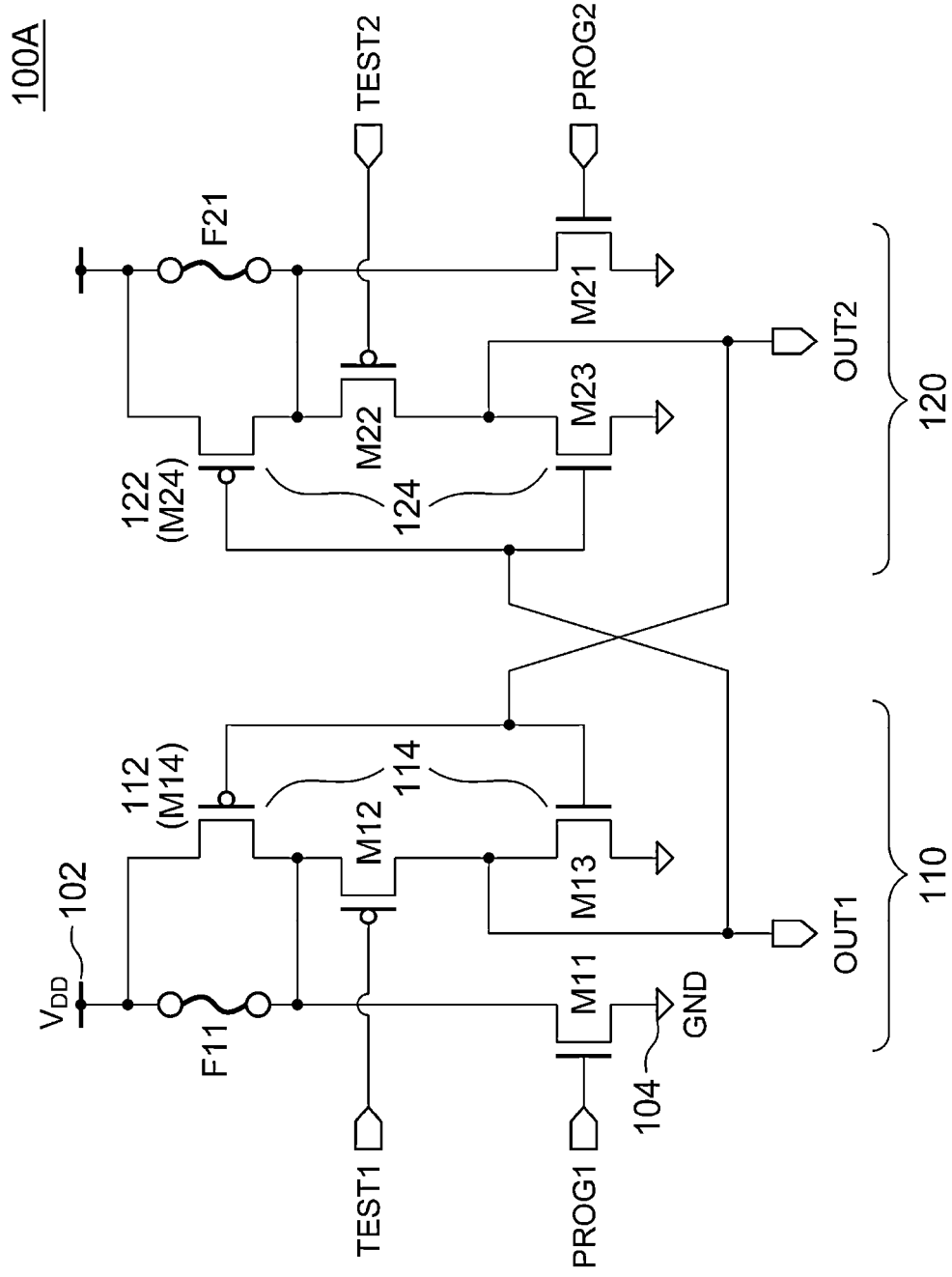
FIG. 1 is a circuit diagram of a fuse memory circuit according to an example 1.

Description will be made regarding the outline of several exemplary embodiments of the present disclosure. The outline is a simplified explanation regarding several concepts of one or multiple embodiments as a preface to the detailed description described later in order to provide a basic understanding of the embodiments. That is to say, the outline described below is by no means intended to restrict the scope of the present invention and the present disclosure. Furthermore, the outline described below is by no means a comprehensive outline of all possible embodiments. That is to say, the outline is by no means intended to identify the indispensable or essential elements of all the embodiments and is by no means intended to define the scope of a part of or all the embodiments. For convenience, in some cases, an "embodiment" as used in the present specification represents a single or multiple embodiments (examples and modifications) disclosed in the present specification.

A fuse memory circuit according to one embodiment includes: a first line being one of a power supply line and a ground line; a second line being the other of the power supply line and the ground line; a first fuse unit; and a second fuse unit. The first fuse unit and the second fuse unit each include: a test terminal; a program terminal; an output terminal; a fuse element has a first end coupled to the first line; a rectification element coupled in parallel with the fuse element; a first transistor has a drain coupled to a second end of the fuse element, a source coupled to the second line, and a gate coupled to the program terminal; a second transistor having a source coupled to the second end of the fuse element, a drain coupled to the output terminal, and a gate coupled to the test terminal; and a third transistor having a drain coupled to the output terminal, and a source coupled to the second line. A gate of the third transistor of the first fuse unit is coupled to the output terminal of the second fuse unit. A gate of the third transistor of the second fuse unit is coupled to the output terminal of the first fuse unit.

The fuse memory circuit employs a configuration provided with two fuse units having the same configuration so as to execute writing in a complementary manner. The third transistor of the first fuse unit and the third transistor of the second fuse unit are cross-coupled so as to allow the two third transistors to latch data. Furthermore, even if data inversion (data corruption) temporarily occurs in the data (state) stored in one of the first fuse unit and the second fuse unit, such an arrangement ensures that such an abnormal state is returned to a normal state using the fuse element that has not been disconnected and a pair of the third transistors cross-coupled.

Furthermore, in an electrostatic discharge test in which a reverse bias voltage is applied across the power supply line and the ground line, the rectification element prevents a current from flowing from the back gate of the first transistor to the fuse element, thereby protecting the fuse element.

In one embodiment, before programming (non-disconnected fuse state), both the second transistor of the first fuse unit and the second transistor of the second fuse unit may be turned on. In this case, current flows through all the elements of the first fuse unit and the second fuse unit. By measuring the circuit current in this state, this is capable of judging structural defects.

In one embodiment, before programming, one of the second transistors of the first fuse unit and the second fuse unit may be turned on, and the other may be turned off. This arrangement is capable of testing whether the output value changes normally without actually programming the fuse element. Also, this allows a desired output to be supplied to a circuit to be trimmed. Also, by measuring the current in this state, this is capable of evaluating a leak current (which will also be referred to as a "static current Iddq").

In one embodiment, the rectification element may include a fourth transistor having a source coupled to the first end of the fuse element and a drain coupled to the second end of the fuse element. The body diode of the MOSFET may be employed as a rectification element.

In one embodiment, a gate of the fourth transistor may be coupled to the gate of the third transistor. With this, the third transistor and the fourth transistor form a CMOS inverter. Furthermore, this has a configuration in which the CMOS inverters of the first fuse unit and the second fuse unit are cross-coupled. This provides an increased gain of the latch circuit. This allows the state to be judged correctly even if the fuse element has a small on/off ratio. Furthermore, this provides an improved amplification speed, thereby providing improved noise resistance.

In one embodiment, the relation $V_{DD} \times R_{M13}/(R_{FUSE}+R_{M12}+R_{M13}) > V_{TINV}$ may hold true with a threshold voltage of a CMOS inverter circuit formed of the third transistor and the fourth transistor as $V_{TINV}$, with a resistance value of the fuse element before disconnection as $R_{FUSE}$, with a power supply voltage as $V_{DD}$, with an on resistance of the second transistor as $R_{M12}$, and with an on resistance of the third transistor as $R_{M13}$. With this, when, due to noise, the state of the fuse memory circuit transits to a different state that differs from that defined by programming, this allows such an abnormal state to be automatically restored to a normal state.

In one embodiment, the first line may be structured as the power supply line, and the second line may be structured as the ground line.

In one embodiment, the first line may be structured as the ground line, and the second line may be structured as the power supply line.

In one embodiment, the fuse element may be structured as a fuse that is capable of being set to an electrically disconnected state by applying a current. In one embodiment, the fuse element may be structured as an antifuse that is capable of being set to an electrically conductive state by applying a current.

EMBODIMENTS

Description will be made below regarding preferred embodiments with reference to the drawings. The same or similar components, members, and processes are denoted by the same reference numerals, and redundant description thereof will be omitted as appropriate. The embodiments have been described for exemplary purposes only and are by no means intended to restrict the present disclosure and the present invention. Also, it is not necessarily essential for the present disclosure and the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electrical connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C, via another member that does not substantially affect the electrical connection between them, or that does not damage the functions or effects of the connection between them, in addition to a state in which they are directly coupled.

Example 1

FIG. 1 is a circuit diagram of a fuse memory circuit 100A according to an example 1. The fuse memory circuit 100A functions as a single-bit nonvolatile memory element that is capable of holding a binary state.

The fuse memory circuit 100A includes a first line 102, a second line 104, a first fuse unit 110 and a second fuse unit 120.

The first line 102 is configured as one of a power supply line VDD and a ground line GND. The second line 104 is configured as the other of the power supply line VDD and the ground line GND. In the present example, the first line 102 is configured as the power supply line VDD, and the second line 104 is configured as the ground line GND.

The first fuse unit 110 and the second fuse unit 120 are coupled between the first line 102 and the second line 104. The first fuse unit 110 and the second fuse unit 120 are configured in the same manner.

The first fuse unit 110 includes a test terminal TEST1, a program terminal PROG1, an output terminal OUT1, a fuse element F11, a rectification element 112, a first transistor M11, a second transistor M12, and a third transistor M13.

One end of the fuse element F11 is coupled to the first line 102 (power supply line VDD). Description will be made below regarding an arrangement in which the fuse element F11 is configured to be electrically conductive before a current is applied and to have a function of being switched to a disconnection state by applying a predetermined current. However, the present invention is not restricted to such an arrangement.

The rectification element 112 is coupled in parallel with the fuse element F11. The rectification element 112 is arranged in a direction so as to allow a current to flow from the ground line GND to the power supply line VDD. In the present example, the rectification element 112 includes a fourth transistor M14 configured as a P-channel transistor. The fourth transistor M14 is arranged such that its source is coupled to the first end of the fuse element F11 (i.e., the first line 102) and its drain is coupled to the second end of the fuse element F11. That is to say, the body diode of the fourth transistor M14 configured as a MOSFET is used as a rectification element.

The first transistor M11 is configured as a program transistor. The first transistor M11 is configured as an NMOS transistor and is arranged such that its drain is coupled to the second end of the fuse element F11 and its source is coupled to the second line 104 (ground line GND). The gate of the first transistor M11 is coupled to a program terminal PROG1.

The second transistor M12 is provided for testing the fuse memory circuit 100A. The second transistor M12 is configured as a PMOS transistor and is arranged such that its source is coupled to the second end of the fuse element F11 and the drain of the first transistor M11 and its gate is coupled to the test terminal TEST1.

The third transistor M13 is configured as a latch transistor. The third transistor M13 is configured as an NMOS transistor and is arranged such that its drain is coupled to the output terminal OUT1 and its source is coupled to the second line 104 (ground line GND).

The above is the configuration of the first fuse unit 110. The second fuse unit 120 is configured in the same manner as the first fuse unit 110. Specifically, the second fuse unit 120 includes a test terminal TEST2, a program terminal PROG2, an output terminal OUT2, a fuse element F21, a rectification element 122, a first transistor M21, a second transistor M22, and a third transistor M23.

The gate of the third transistor M13 of the first fuse unit 110 is coupled to the output terminal OUT2 of the second fuse unit 120. Furthermore, the gate of the third transistor M23 of the second fuse unit 120 is coupled to the output terminal OUT1 of the first fuse unit 110.

The third transistor M13 and the fourth transistor M14 of the first fuse unit 110 form a CMOS inverter circuit 114. Similarly, the third transistor M23 and the fourth transistor M24 of the second fuse unit 120 form a CMOS inverter circuit 124. The two CMOS inverter circuits 114 and 124 are cross-coupled so as to function as a latch circuit. It should be noted that the fourth transistor M14 (M24) may be biased such that it is turned off. In this case, the fuse memory circuit 100A has a configuration that is equivalent to that shown in FIG. 6.

The two outputs OUT1 and OUT2 of the fuse memory circuit 100A are supplied to an unshown circuit to be trimmed. It should be noted that, when the fuse memory circuit 100A is operating normally, the two outputs OUT1 and OUT2 exhibit exclusive values. Accordingly, the circuit to be trimmed may reference only one of the two outputs.

The above is the configuration of the fuse memory circuit 100A. Next, description will be made regarding the operation thereof. It should be noted that the fuse memory circuit 100A is not required to execute all the tests described below. Also, the fuse memory circuit 100A may execute only a part of the tests described below.

1. First Test

Description will be made regarding the first test before programming (writing). In the first test, a low-level signal is applied to the test terminal TEST1 of the first fuse unit 110 and the test terminal TEST2 of the second fuse unit 120 so as to set the second transistors M12 and M22 to the on state.

In the first fuse unit 110, a current is supplied to the second transistor M12 and the third transistor M13 from the power supply line VDD via the fuse element F11. In the second fuse unit 120, a current is supplied to the second transistor M22 and the third transistor M23 from the power supply line VDD via the fuse element F21. As a result, the output OUT1 of the first fuse unit 110 and the output OUT2 of the second fuse unit 120 are balanced to an intermediate electric potential.

When the output OUT1 exhibits the intermediate electric potential, this provides a current flowing through the fourth transistor M24 of the second fuse unit 120. When the output OUT2 exhibits the intermediate electric potential, this provides a current flowing through the fourth transistor M14 of the first fuse unit 110.

In this state, a current Ion that flows through the fuse memory circuit 100A is measured. This allows the overall characteristics to be tested giving consideration to all the transistors other than the fuse element F11 (F21) and the first transistor M11 (M12), thereby detecting structural defects. The first test will also be referred to as the "Ion test".

2. Second Test

Description will be made regarding a second test before programming (writing). In the second test, the second transistor M12 of the first fuse unit 110 and the second transistor M22 of the second fuse unit 120 are alternately turned on in an exclusive manner.

In a case in which both the first fuse unit 110 and the second fuse unit 120 are operating normally, when TEST1="H" and TEST2="L", the second transistor M12 is turned off and the second transistor M22 is turned on. In this state, the output OUT1 of the first fuse unit 110 is set to "L". When the output OUT1 is set to "L", the output OUT2 of the CMOS inverter circuit 124 on the second fuse unit 120 side is set to "H", which is input to the CMOS inverter circuit 114 of the first fuse unit 110 and becomes latched.

In a case in which both the first fuse unit 110 and the second fuse unit 120 are operating normally, when TEST1="L" and TEST2="H", the second transistor M22 is turned off and the second transistor M12 is turned on. In this state, the output OUT2 of the second fuse unit 120 is set to "L". When the output OUT2 is set to "L", the output OUT1 of the CMOS inverter circuit 114 on the first fuse unit 110 side is set to "H", which is input to the CMOS inverter circuit 124 of the second fuse unit 120 and becomes latched.

The operations described above are each equivalent to an operation when either the fuse element F11 or F12 is disconnected. With this fault detection test, this is capable of detecting the presence or absence of an abnormal state in each element other than the first transistors M11 and M21.

In this case, all the current paths from the power supply line to the ground line are disconnected. At this time, the circuit current is measured, thereby allowing a static current (leak current Iddq) to be evaluated.

3. Virtual Trimming

Typically, the outputs OUT1 and OUT2 of the fuse memory circuit 100 are referenced by an unshown circuit to be trimmed. The operating state (operating mode, operating parameter, circuit constant) of the circuit to be trimmed is set according to the outputs OUT1 and OUT2. The virtual trimming is a function for providing desired outputs OUT1 and OUT2 from the fuse memory circuit 100A to a circuit to be trimmed before actually programming the fuse memory circuit 100.

In the virtual trimming, the same operation as that of the fault detection test described above is executed. That is to say, in a case in which OUT1="L" and OUT2="H" are to be generated, TEST1 and TEST2 are preferably set to "H" and "L", respectively. Conversely, in a case in which OUT1="H" and OUT2="L" are to be generated, TEST1 and TEST2 are preferably set to "L" and "H", respectively.

4. Programming (i) In a case in which a state of OUT1="H" and OUT2="L" is to be programmed, PROG1="H" and PROG2="L" are input. In a case in which PROG1="H", the first transistor M11 of the first fuse unit 110 is turned on. In this state, a current flows through the fuse element F11, thereby disconnecting the fuse element F11.

(ii) In a case in which a state of OUT1="L" and OUT2="H" is to be programmed, PROG1="L" and PROG2="H" are input. In a case in which PROG2="H", the first transistor M21 of the second fuse unit 120 is turned on. In this state, a current flows through the fuse element F21, thereby disconnecting the fuse element F21.

In this programming, the second transistor (M12 or M22) on the fuse unit side including a fuse element to be disconnected is preferably turned off. Conversely, the second transistor on the other fuse unit side is preferably turned on.

Specifically, in a case in which a state of OUT1="H" and OUT2="L" is to be programmed, TEST1 and TEST2 are preferably set to "H" and "L", respectively, so as to turn off the second transistor M12 and turn on the second transistor M22. In this case, this provides the same operation as that of the virtual trimming described above, thereby generating a state in which OUT1="L" and OUT2="H". As a result, the fourth transistor M14 arranged in parallel with the fuse element F11 to be disconnected is turned off. Accordingly, this allows a current that flows through the first transistor M11 to be concentrated in the fuse element F11.

Conversely, in a case in which a state of OUT1="L" and OUT2="H" is to be programmed, TEST1 and TEST2 are preferably set to "L" and "H", respectively, so as to turn on the second transistor M12 and turn off the second transistor M22. In this case, this provides the same operation as that of the virtual trimming described above, thereby generating a state in which OUT1="H" and OUT2="L". As a result, the fourth transistor M24 arranged in parallel with the fuse element F21 to be disconnected is turned off. Accordingly, this allows a current that flows through the first transistor M21 to be concentrated in the fuse element F21.

5. After Programming

Once programming is completed, all the inputs PROG1, PROG2, TEST1, and TEST2 of the fuse memory circuit 100A are fixed to "L". In this state in which PROG1 and PROG2 are fixed to "L", the first transistors M11 and M12 are each fixed to the off state. Accordingly, this is capable of preventing one from among the fuse elements F11 and F12 that is not to be disconnected from being accidentally disconnected.

Furthermore, in a state in which TEST1 and TEST2 are each fixed to "L", the second transistors M12 and M22 are each fixed to the on state. After programming for disconnecting the fuse element F11 on the first fuse unit 110 side, the output OUT2 is pulled up to the power supply voltage VDD by the fuse element F21 and the second transistor M22 of the second fuse unit 120. In this state, the output OUT2 exhibits "H", and the output OUT1 becomes "L".

Conversely, after programming to disconnect the fuse element F21 on the second fuse unit 120 side, the output OUT1 is pulled up to the power supply voltage VDD by the fuse element F11 and the second transistor M12 of the first fuse unit 110. In this state, the output OUT1 exhibits "H", and the output OUT2 becomes "L".

Figure 2:
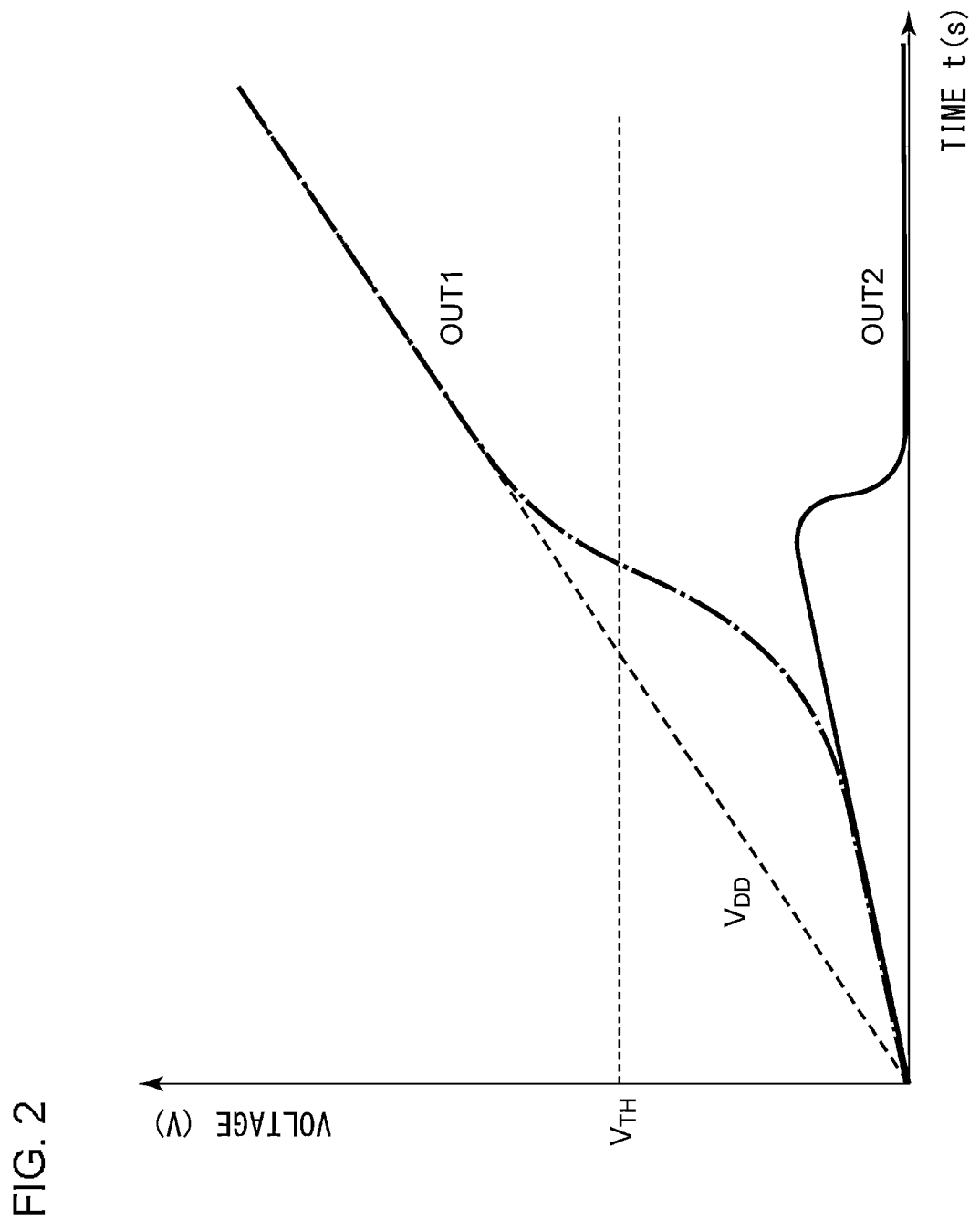

FIG. 2 is a diagram showing an output waveform of the fuse memory circuit 100A shown in FIG. 1 when the power supply is turned on after programming. Here, VTH represents the threshold voltage of the transistors.

In the fuse memory circuit 100A, all the transistors operate in two states, i.e., the on state and the off state. This allows the fuse memory circuit 100A to operate in a range from a very low voltage. With such a wide-range operation, this allows the circuit to be trimmed to reference a correct value provided by the fuse memory circuit 100A immediately after the power supply is turned on.

6. Soft Error Correction

Figure 3:
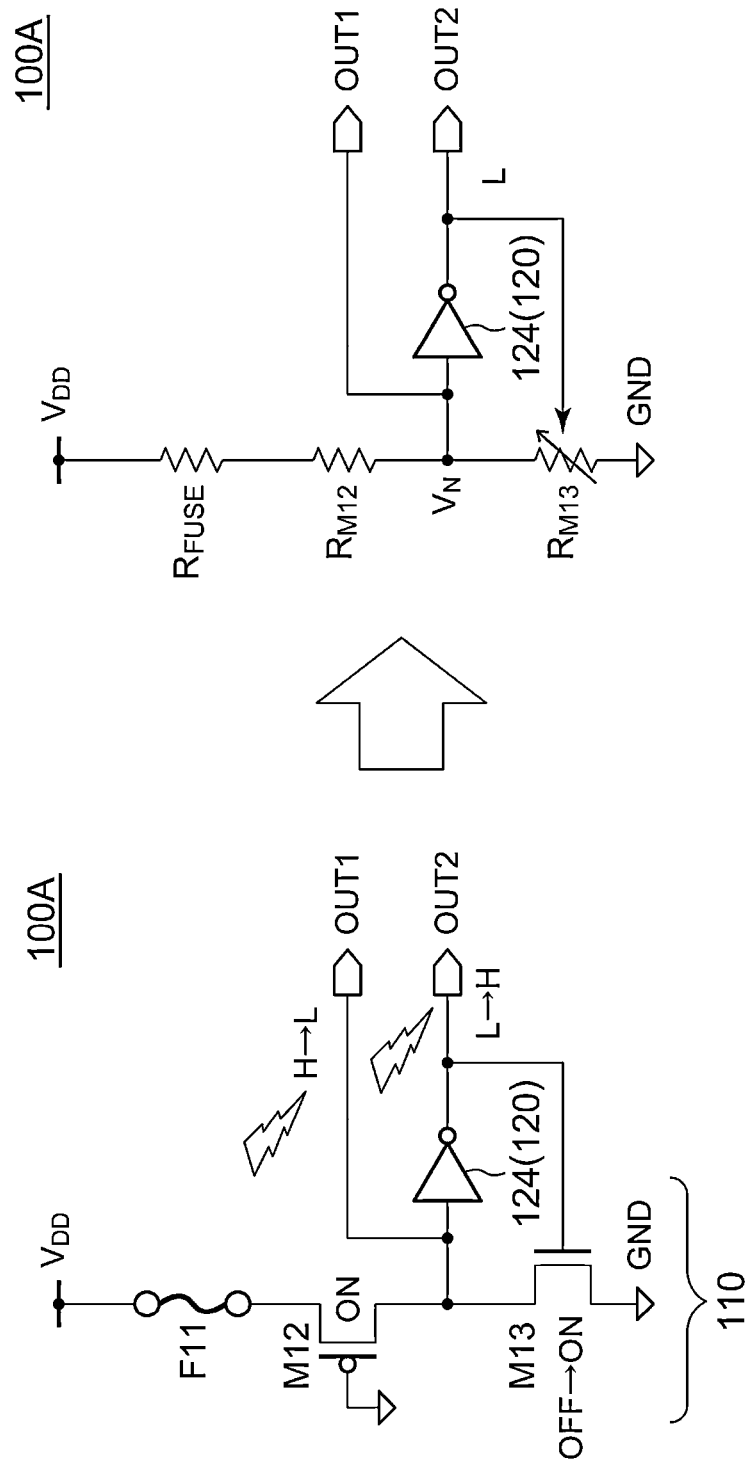
FIG. 3 is a diagram for explaining soft error correction by the fuse memory circuit shown in FIG. 1.

FIG. 3 is a diagram for explaining soft error correction by the fuse memory circuit 100A shown in FIG. 1. In this state, the fuse memory circuit 100A is programmed such that OUT1="H" and OUT2="L". FIG. 3 shows an equivalent circuit of the fuse memory circuit 100A at this time. Description will be made assuming that, in this state, inversion occurs in the electric potential at the output OUT1 or OUT2 due to the occurrence of noise at that output.

Description will be made directing attention to the electric potential at the output OUT1. When the output OUT2 becomes "H" due to noise, the third transistor M13 switches from the off state to the on state. The resistance value of the third transistor M13 in the on state is represented by $R_{M13}$. Furthermore, the resistance value of the fuse element F11 is represented by $R_{FUSE}$, and the resistance value of the second transistor M12 is represented by $R_{M12}$. The voltage level $V_N$ of the output OUT1 settles to $V_N=V_{DD} \times R_{M13}/(R_{FUSE}+R_{M12}+R_{M13})$. Accordingly, by designing the resistance value $R_{M13}$ of the third transistor M13 (i.e., the W/L ratio of the MOSFET) such that $V_N$ is higher than the threshold voltage $V_{TINV}$ of the CMOS inverter circuit 124, such an arrangement allows an output error to be automatically returned to a normal value.

7. Countermeasure Against Electrostatic Discharge Damage

It is necessary to protect a fuse element on a non-disconnected side from being damaged after a semiconductor apparatus provided with the programmed fuse memory circuit 100A is shipped.

Figure 4:
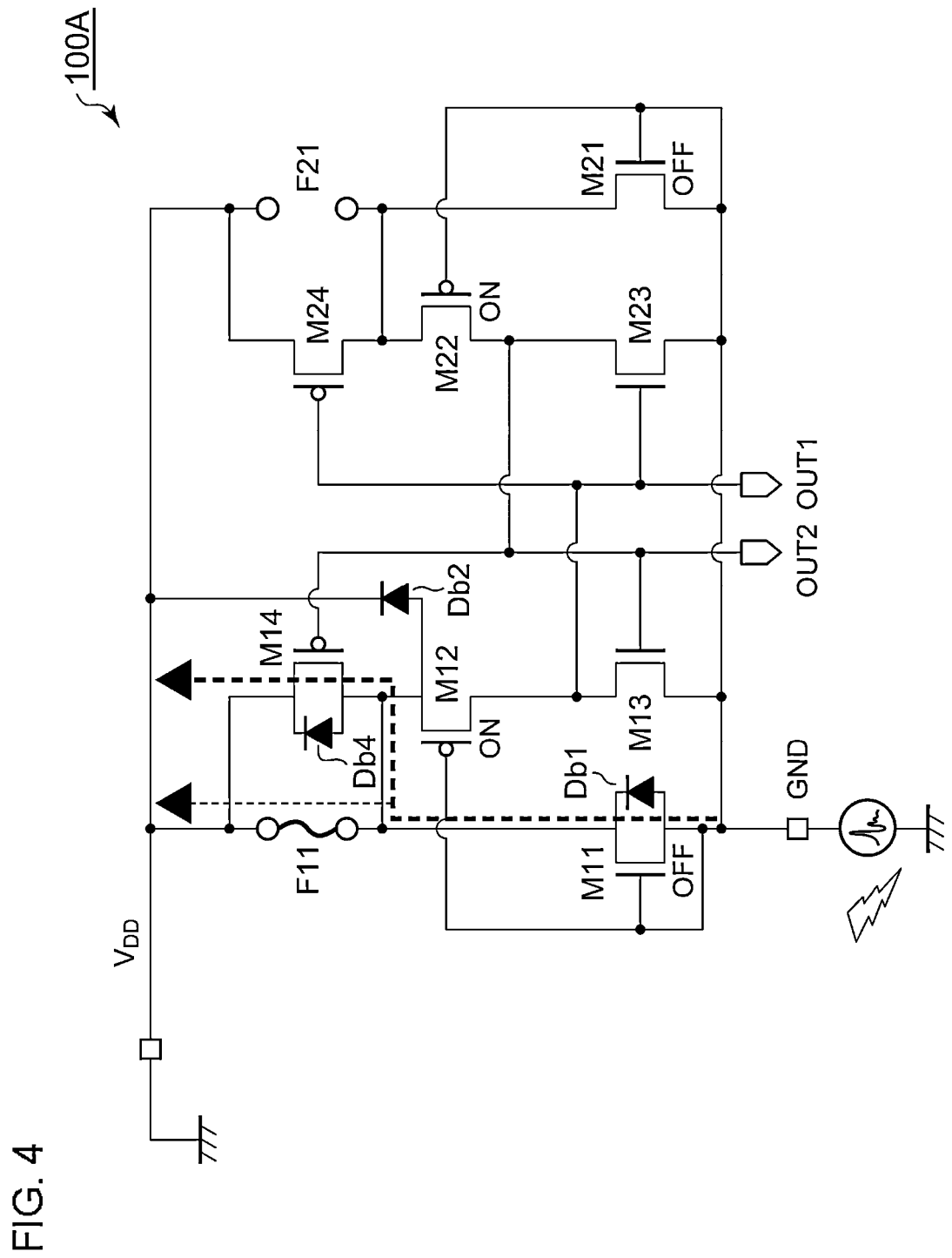
FIG. 4 is an equivalent circuit diagram of a fuse memory circuit when an electrostatic discharge test is executed.

FIG. 4 is an equivalent circuit diagram of the fuse memory circuit 100A when an electrostatic discharge test is executed. FIG. 4 shows a test in which an electrostatic discharge is applied between the power supply line VDD and the ground line GND in a reverse bias state. That is to say, the power supply line VDD side is grounded (VDD common). Furthermore, an electrostatic discharge is applied to the ground line GND side.

Description will be made below regarding the first fuse unit 110 side. The same can be said of the second fuse unit 120 side. When a reverse bias state occurs in the VDD common state, this involves a current that flows through a body diode db1 that occurs between the back gate and the drain of the first transistor M11, which can become a problem.

With the first fuse unit 110A, this current is bypassed via a body diode db4 that occurs between the drain and the back gate of the fourth transistor M14 that functions as a rectification element 112. This is capable of preventing the fuse element F11 from being unintentionally disconnected. Furthermore, such an arrangement allows this current to flow through a body diode db2 that occurs between the source and the back gate of the second transistor M12, thereby suppressing a current from flowing through the fuse element F11.

Figure 5:
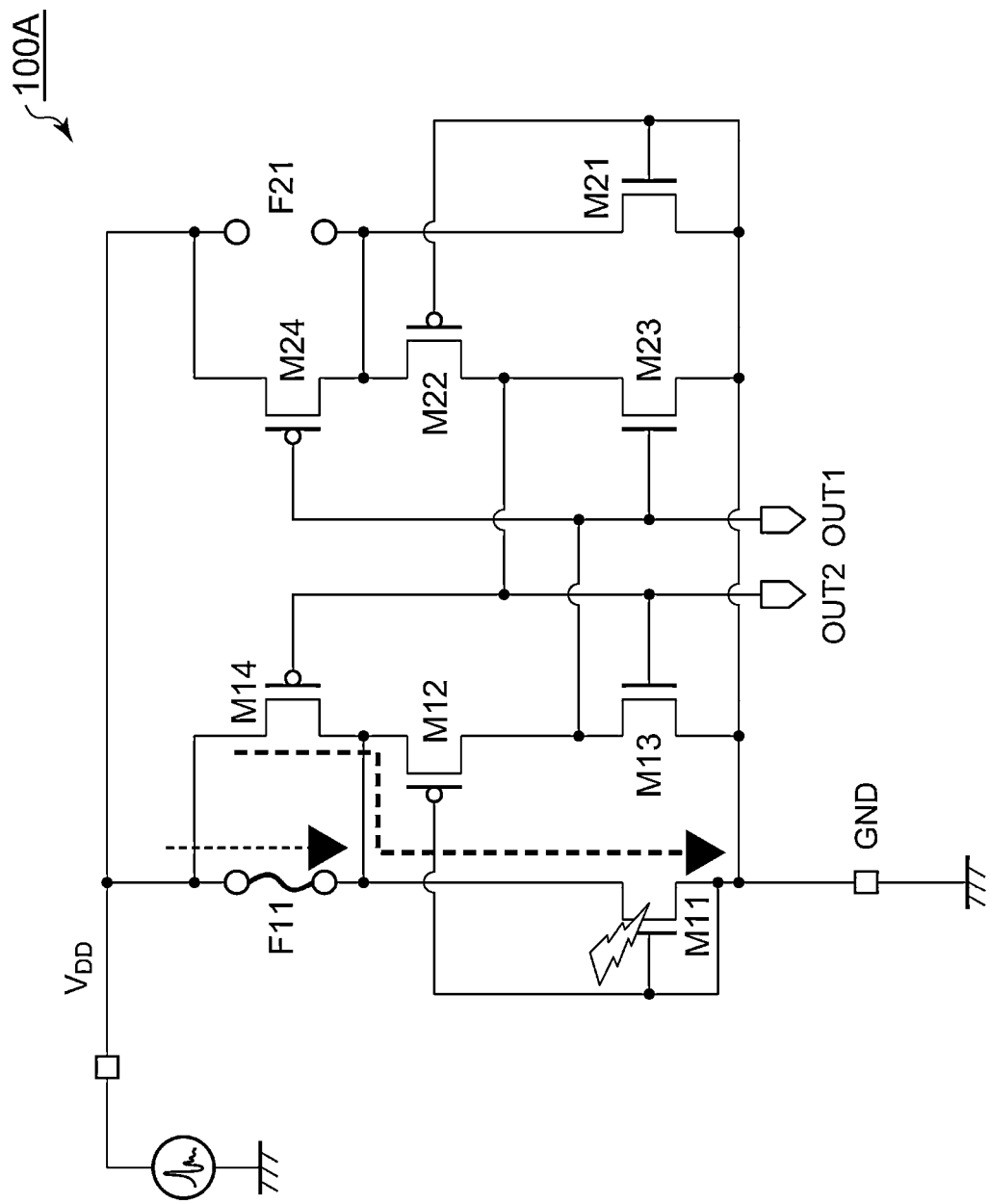
FIG. 5 is an equivalent circuit diagram of a fuse memory circuit when an electrostatic discharge test is executed.

FIG. 5 is an equivalent circuit diagram of the fuse memory circuit 100A when an electrostatic discharge test is executed. FIG. 5 shows a test in which an electrostatic discharge is applied between the power supply line VDD and the ground line GND in the forward bias state. That is to say, the ground line GND side is grounded (GND common), and an electrostatic discharge is applied to the power supply VDD side. When a forward bias is applied in the GND common state, it is necessary to release the electrostatic discharge energy from the power supply pin or the ground pin before breakdown occurs in the first transistor M11. In the fuse memory circuit 100A after programming so as to disconnect the fuse element F21, the fourth transistor M14 is already set to the on state in the stage when the breakdown starts to occur in the first transistor M11. With this, a current flows between the source and drain (channel) of the fourth transistor M14 instead of the fuse element F11, thereby protecting the fuse element F11.

The above is the operation of the fuse memory circuit 100A. The fuse memory circuit 100A has the following characteristics.

After the power supply is turned on, the fuse memory circuit 100A generates an output based on a program without any preliminary operation. Accordingly, such an arrangement does not require a reading operation or an initializing operation.

Furthermore, as described above, such an arrangement supports automatic restoration when data corruption (soft error) occurs due to external disturbance noise. Accordingly, it can be said that such an arrangement has high noise resistance.

Furthermore, such an arrangement involves substantially zero steady-state current (leakage current only) regardless of whether or not the fuse element is disconnected. Accordingly, such an arrangement has an advantage of a small steady-state current.

Furthermore, the fuse memory circuit 100A can be configured with a small circuit area, a small number of pins, a low test cost, and a small number of layers, thereby providing an advantage from the cost viewpoint.

In addition, all the transistors of the fuse memory circuit 100A operate in two states, i.e., the on state and the off state. This allows the fuse memory circuit 100A to operate in a range from a very low voltage. Specifically, the fuse memory circuit 100A is capable of operating in an operation voltage range with a sufficient margin with respect to the operating voltage ranges of all the circuits to be controlled.

Furthermore, as described above, the fuse memory circuit 100A is capable of supporting virtual trimming before programming and supporting fault detection before and after programming. That is to say, the fuse memory circuit 100A has an advantage from the testability viewpoint.

Furthermore, such an arrangement does not require a peripheral circuit for a complicated control operation and testing. Description thereof will be made later.

Furthermore, as described above with reference to FIGS. 4 and 5, it can be said that this arrangement has high electrostatic discharge resistance in a test in which an electrostatic discharge is applied, thereby providing high reliability.

Example 2

Figure 6:
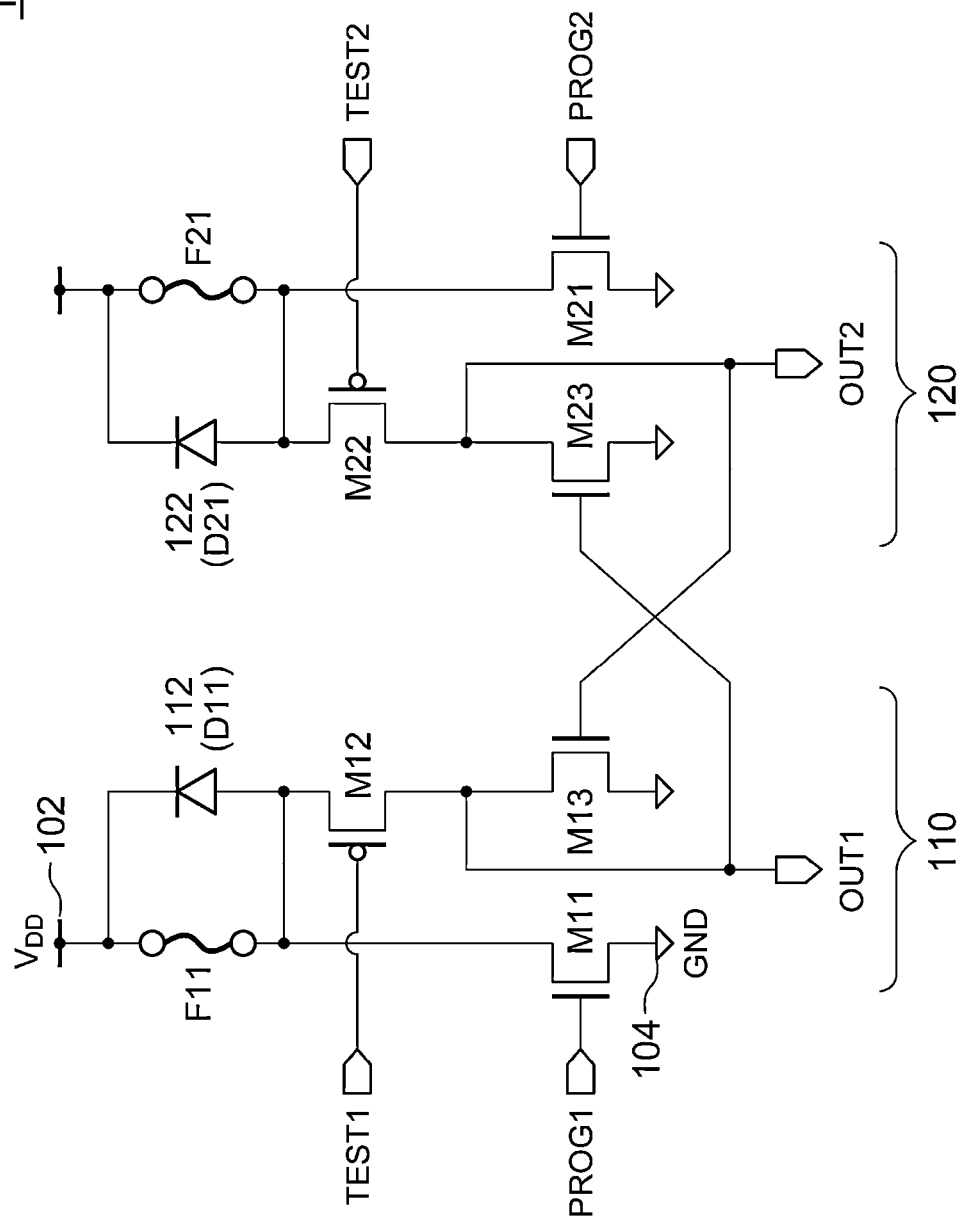
FIG. 6 is a circuit diagram of a fuse memory circuit according to an example 2.

FIG. 6 is a circuit diagram of a fuse memory circuit 100B according to an example 2. The fuse memory circuit 100B includes a diode D11 (D21) instead of the fourth transistor M14 (M24). The diode D11 is coupled in a direction such that its cathode is coupled to the high electric potential (power supply line VDD) side and its anode is coupled to the low electric potential (ground line GND) side. The other configuration thereof is the same as that shown in FIG. 1.

The fuse memory circuit 100B provides the same basic operation as that of the fuse memory circuit 100A according to the example 1 except for the logic levels (H/L) of the signals to be supplied to the terminals PROG1, PROG2, TEST1, and TEST.

Description has been made with reference to FIG. 1 regarding an arrangement in which the third transistor M13 and the fourth transistor M14 on the first fuse unit 110 side form the CMOS inverter circuit 114, and the third transistor M23 and the fourth transistor M24 on the second fuse unit 120 side form the CMOS inverter circuit 124. Furthermore, the two CMOS inverter circuits 114 and 124 are cross-coupled so as to form a latch circuit. In contrast, FIG. 6 shows an arrangement in which the third transistors M13 and M23 are cross-coupled so as to form a latch circuit. Accordingly, the latch circuit has a gain that is lower than that of the fuse memory circuit 100A shown in FIG. 1. In other words, the example 1 allows the state to be judged even in a case in which the fuse element has a small on/off ratio as compared with the example 2. Such an arrangement provides a high amplification speed. Accordingly, it can be said that such an arrangement has high noise resistance.

Example 3

Figure 7:
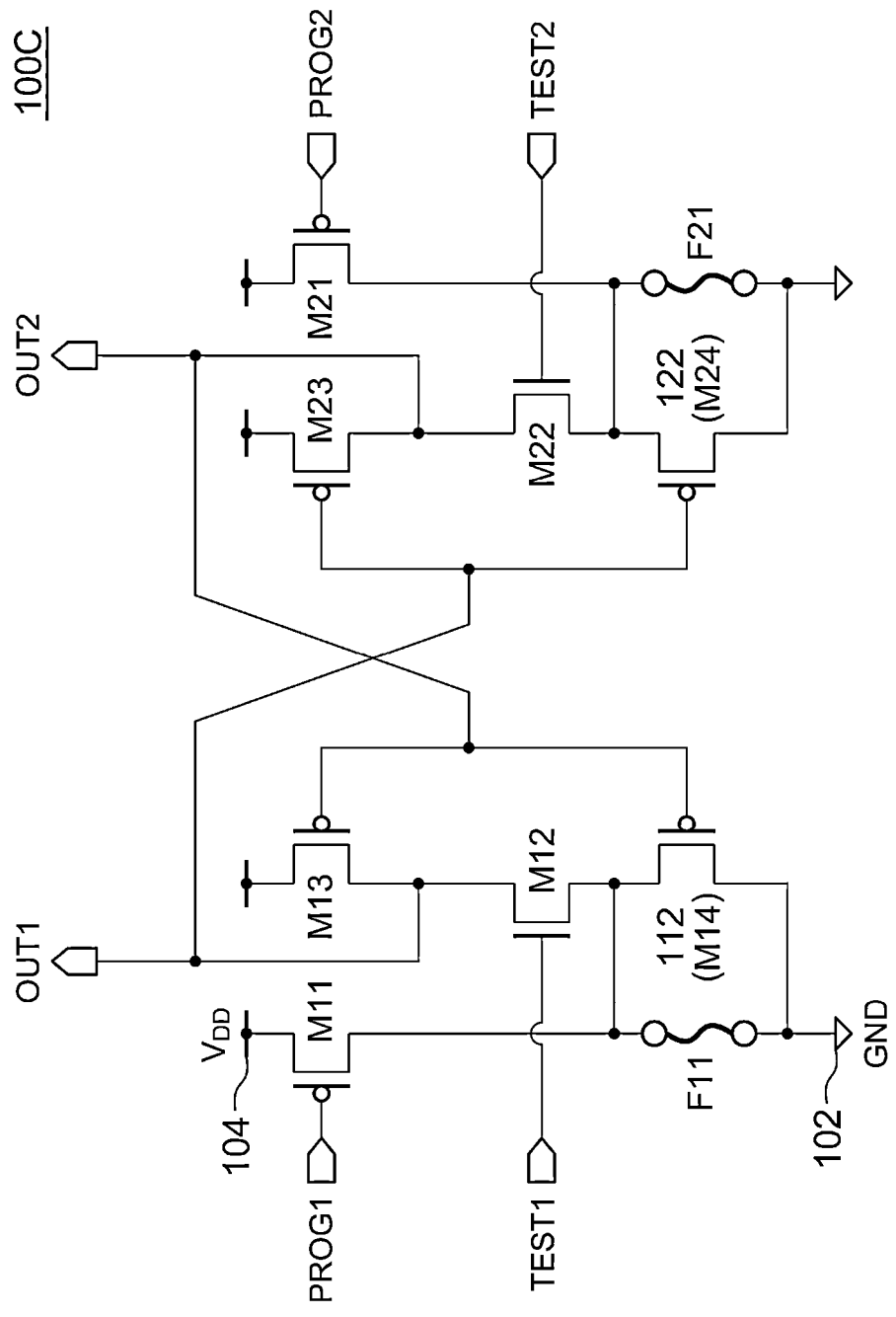
FIG. 7 is a circuit diagram of a fuse memory circuit according to an example 3.

FIG. 7 is a circuit diagram of a fuse memory circuit 100C according to an example 3. The fuse memory circuit 100C has a configuration in which the top and bottom of the fuse memory circuit 100A shown in FIG. 1 are inverted, and the P-channel elements and N-channel elements are mutually interchanged.

Specifically, in the example 3, the first line 102 is configured as the ground line GND and the second line 104 is configured as the power supply line VDD.

This arrangement also provides the same effects as those of the fuse memory circuit 100A shown in FIG. 1.

Example 4

Figure 8:
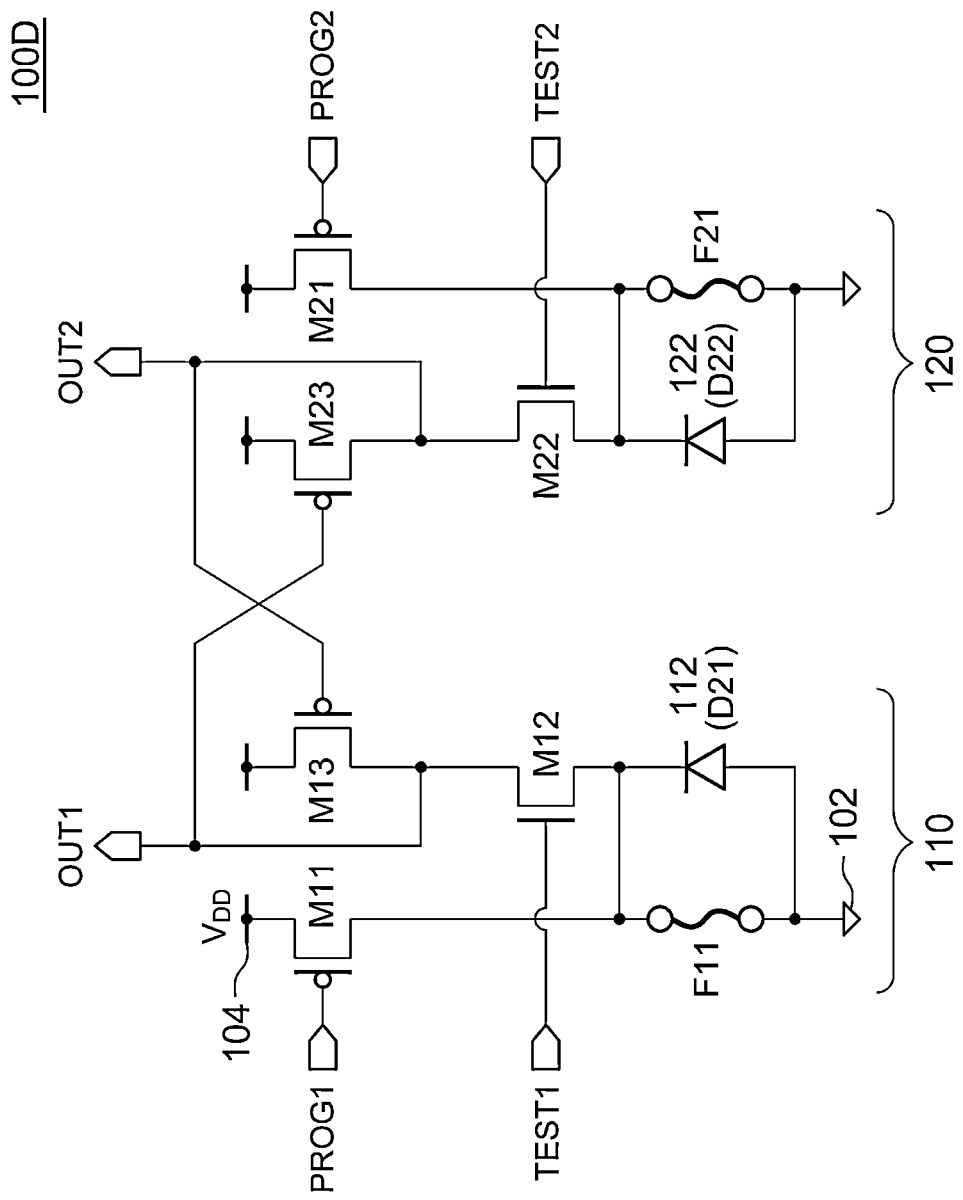
FIG. 8 is a circuit diagram of a fuse memory circuit according to an example 4.

FIG. 8 is a circuit diagram of a fuse memory circuit 100D according to an example 4. The fuse memory circuit 100D has the same configuration as that of the fuse memory circuit 100C shown in FIG. 7 except that the fourth transistors M14 and M24 are replaced by diodes D11 and D12.

This arrangement also provides the same effects as those of the fuse memory circuit 100A shown in FIG. 1.

Next, description will be made regarding a peripheral circuit of each of the fuse memory circuits 100A through 100D (which will be collectively referred to as the "fuse memory circuit 100" hereafter).

Peripheral Circuit

Figure 9:
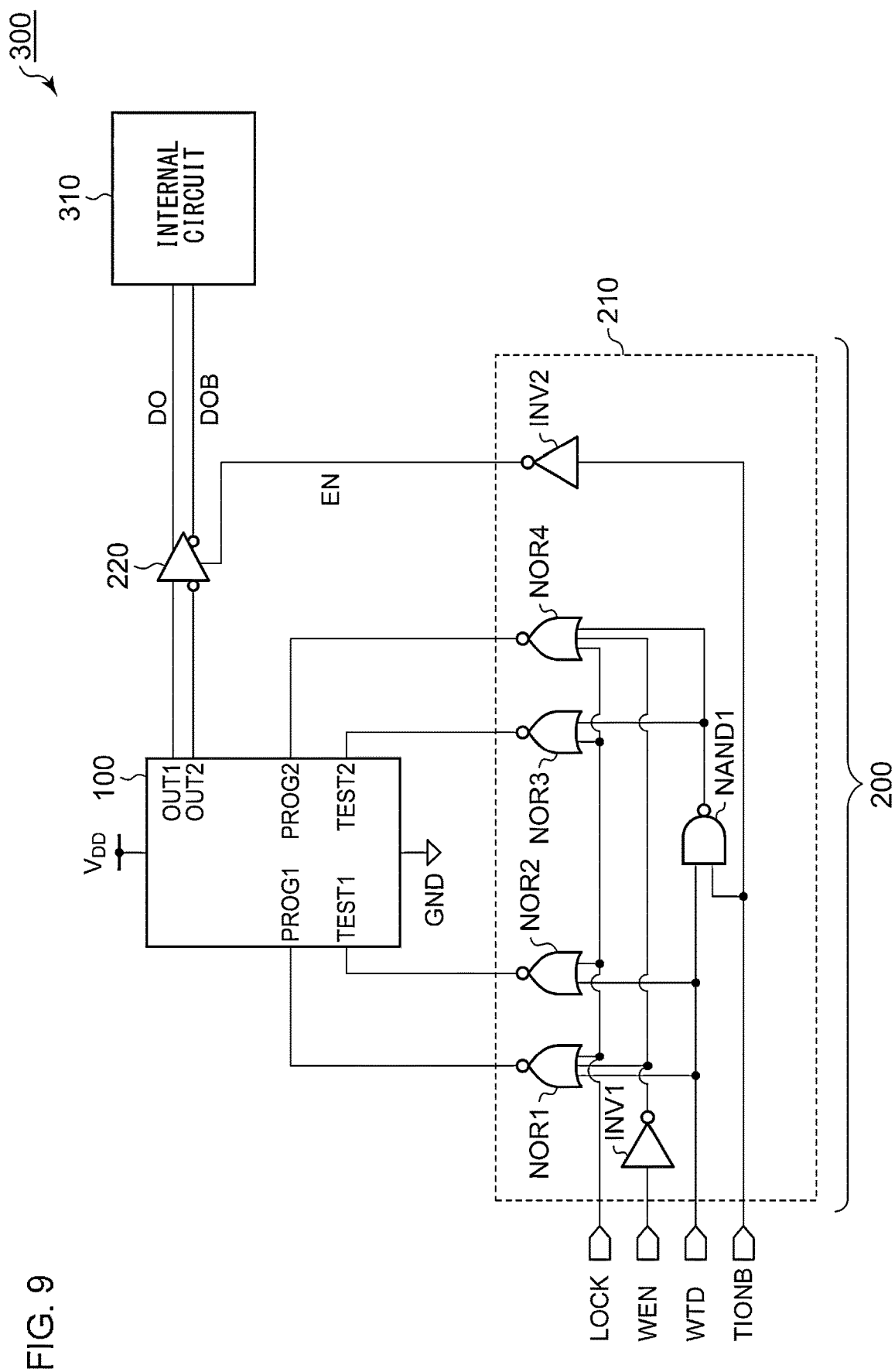
FIG. 9 is a circuit diagram of a semiconductor apparatus provided with a fuse memory circuit.

FIG. 9 is a circuit diagram of a semiconductor apparatus 300 provided with the fuse memory circuit 100. The semiconductor apparatus 300 includes a bit circuit 200 and an internal circuit 310. The bit circuit 200 includes a control circuit 210 and an output buffer 220 in addition to the fuse memory circuit 100. The output buffer 220 receives the outputs OUT1 and OUT2 of the fuse memory circuit 100. The internal circuit 310, which is to be trimmed, references the outputs DO and DOB of the output buffer 220. The "B" at the end of each signal name represents logical inversion.

The control circuit 210 receives the input of multiple control signals (lock signal LOCK, write enable signal WEN, write data WTD, and TIONB signal).

The lock signal LOCK is designed such that it is negated (e.g., "L") before programming, and asserted (e.g., "H") after programming.

The write enable signal WEN is mainly designed such that it is asserted (e.g., high level) when the fuse memory circuit 100 is programmed.

The write data WTD indicates values to be programmed, or data for indicating the state of the fuse memory circuit 100 when the virtual trimming or fault detection is executed.

The TIONB signal is asserted (low level, because the "B" at the end represents "logical inversion") when the first test is executed.

The outputs OUT1 and OUT2 of the fuse memory circuit 100 are supplied to the internal circuit 310 via the output buffer 220. The state of the internal circuit 310 is trimmed (set) based on the outputs DO and DOB of the output buffer 220.

As described above, in the first test, the outputs OUT1 and OUT2 of the fuse memory circuit 100 are balanced to an intermediate electric potential. In a case in which the output buffer 220 is operated in this state, a through current flows through the output buffer 220. The output buffer 220 is preferably configured with "enable". By disabling the output buffer 220 during the first test, such an arrangement is capable of preventing a through current from flowing through the output buffer 220.

The control circuit 210 generates control signals (PROG1, PROG2, TEST1, TEST2) for the fuse memory circuit 100 and an enable signal EN for the output buffer 220 based on the control signals LOCK, WEN, WTD, and TIONB.

The control signals TEST1, TEST2, PROG1, PROG2, and EN are each designed such that a level at which the corresponding transistor turns on when it receives the control signal via its gate is called the on level, and a level at which the corresponding transistor turns off is called the off level.

For example, in a case in which the second transistor M12 is configured as a PMOS transistor, the control signal TEST1 is designed with the on level as "L", and with the off level as "H". Conversely, in a case in which the second transistor M12 is configured as an NMOS transistor, the control signal TEST1 is designed with the on level as "H", and with the off level as "L".

After programming, when the LOCK signal is asserted (H), the control circuit 210 sets the control signals TEST1 and TEST2 to the on level so as to fix the second transistors M12 and M22 to the on state. Furthermore, when the LOCK signal is asserted (H), the control circuit 210 sets the control signals PROG1 and PROG2 to the off level so as to fix the first transistors M11 and M21 to the off state.

When the LOCK signal is negated (L) before programming, the control circuit 210 changes the control signals TEST1, TEST2, PROG1, and PROG2 according to the WEN signal, WTD signal, and TIONB signal.

Specifically, when the WTD signal is set to H, the WEN signal is negated (L), and the TIONB signal is asserted (L), the control circuit 210 is set to the first test mode. In this mode, both the control signals TEST1 and TEST2 are set to the on level so as to set the second transistors M12 and M22 to the on state.

Furthermore, when the WEN signal is negated (L) and the TIONB signal is negated (H), the control circuit 210 sets the outputs OUT1 and OUT2 of the fuse memory circuit 100 according to the WTD signal, so as to set the virtual trimming mode or fault detection mode.

Furthermore, when the WEN signal is asserted (H), the control circuit 210 sets one of the two signals, i.e., the PROG1 signal and the PROG2 signal, to the on level, and sets the other signal to the off level, according to the WTD signal, so as to write data to the fuse memory circuit 100.

The control circuit 210 shown in FIG. 9 is designed for the fuse memory circuit 100A shown in FIG. 1 or the fuse memory circuit 100B shown in FIG. 6. The control circuit 210 can be configured as a combination circuit. The control circuit 210 includes four NOR gates NOR1 through NOR4, inverters INV1 and INV2, and a NAND gate NAND1. However, the present invention is not restricted to such an arrangement.

The inverter INV1 inverts the WEN signal. The NOR gate NOR1 generates the logical NOR of the LOCK signal, the output of the inverter INV1, and the WTD signal, so as to output the PROG1 signal.

The NOR gate NOR2 generates the logical NOR of the LOCK signal and the WTD signal, so as to output the TEST1 signal.

The NAND gate NAND1 generates the logical NAND of the WTD signal and the TIONB signal. The NOR gate NOR3 generates the logical NOR of the LOCK signal and the output of the NAND gate NAND1, so as to output the TEST2 signal. The NOR gate NOR4 generates the logical NOR of the LOCK signal, the output of the inverter INV1, and the output of the NAND gate NAND1, so as to output the PROG2 signal.

The inverter INV2 inverts the TIONB signal so as to generate the enable signal EN for the output buffer 220. When the TIONB signal is asserted (low level), i.e., when the first test mode is set, the output buffer 220 is disabled. When the TIONB signal is negated (high level), i.e., when the mode is set to a mode other than the first test mode, the output buffer 220 is enabled.

It should be noted that the configuration of the control circuit 210 is not restricted to that shown in FIG. 9. A control circuit can be designed by those skilled in this art such that it is capable of supplying an appropriate control signal for each of the fuse memory circuits 100A through 100D.

Figure 10:
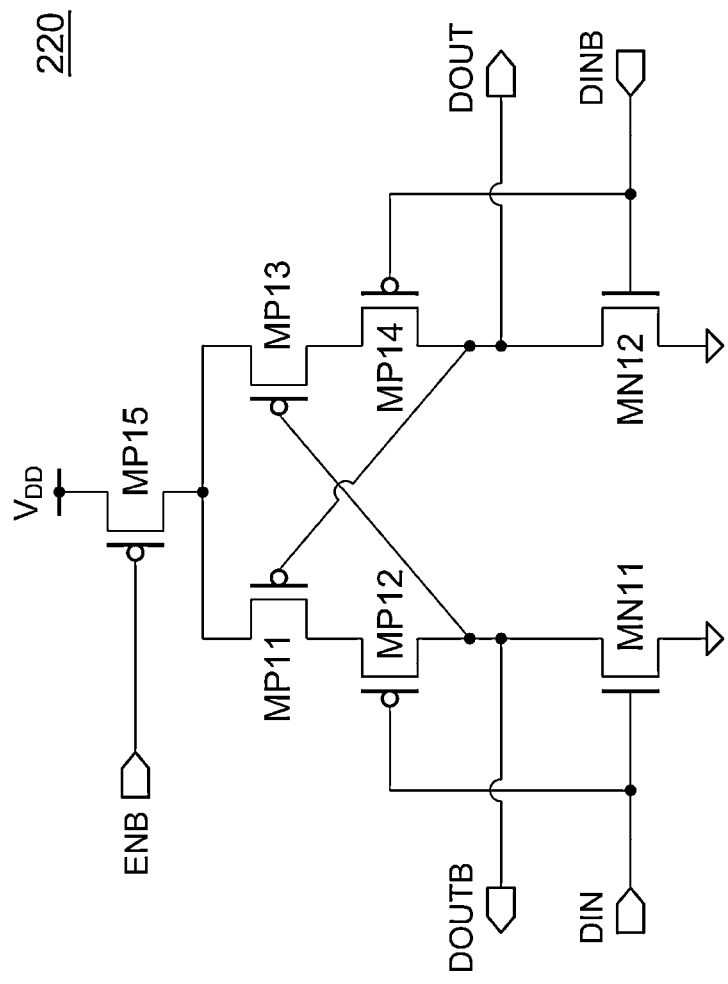
FIG. 10 is a circuit diagram showing an example configuration of an output buffer.

FIG. 10 is a circuit diagram showing an example configuration of the output buffer 220. The output buffer 220 is configured as a cross-coupled type output buffer including PMOS transistors MP11 through MP15 and NMOS transistors MN11 and MN12. An inverted-logic enable signal ENB is input to the gate of the PMOS transistor MP15. When the enable signal ENB is asserted (L), the output buffer 220 is enabled. Conversely, when the enable signal ENB is negated (H), the output buffer 220 is disabled. By negating the enable signal ENB during the first test period in which the input terminals DIN and DINB of the output buffer 220 are each set to an intermediate voltage, this is capable of preventing the occurrence of a through current in the output buffer 220.

With the output buffer 220 having such a cross-coupled configuration, this allows the output buffer 220 to have hysteresis, thereby providing improved noise resistance.

Figure 11:
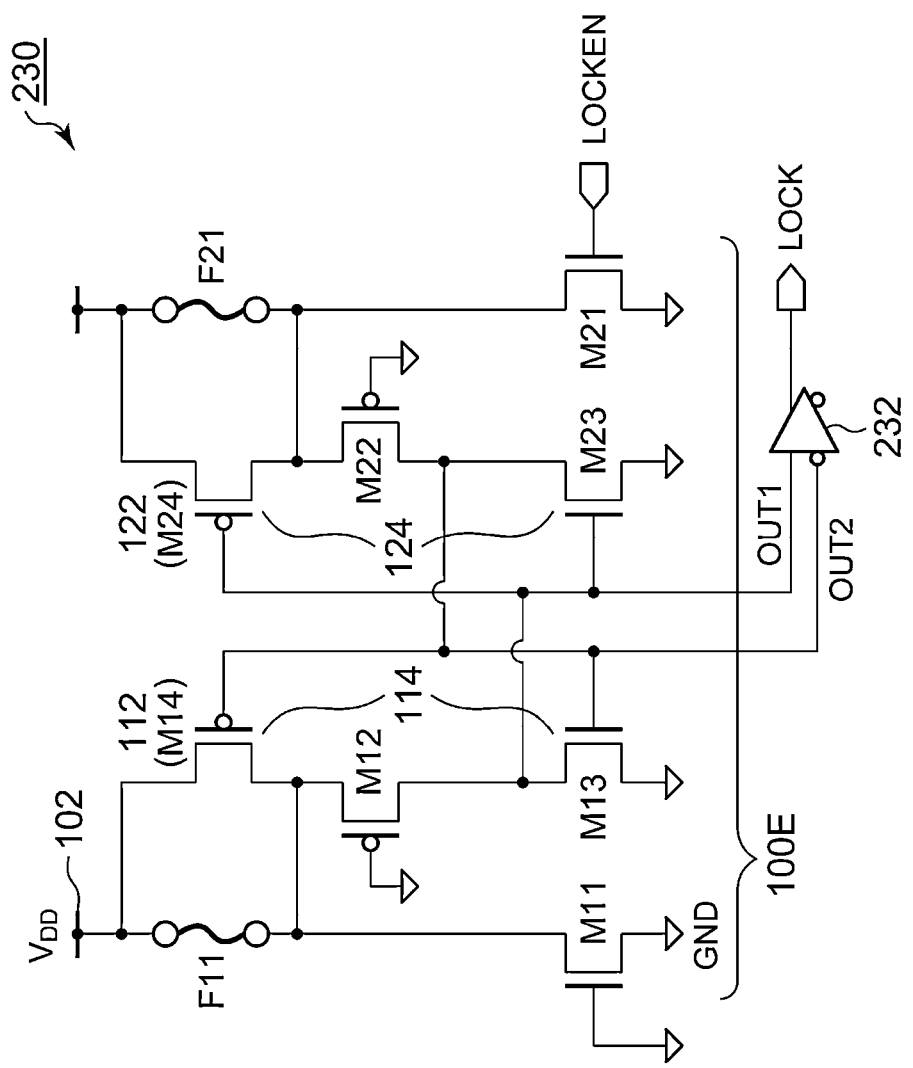
FIG. 11 is a circuit diagram showing an example configuration of a lock circuit.

FIG. 11 is a circuit diagram showing an example configuration of the lock circuit 230. The lock circuit 230 is integrated in the semiconductor apparatus 300 together with the fuse memory circuit 100 and the bit circuit 200.

The lock circuit 230 generates the lock signal LOCK. The lock circuit 230 includes a fuse memory circuit 100E and output buffer 232. The fuse memory circuit 100E can be configured in the same manner as the fuse memory circuit 100A (or any one of 100B through 100D) shown in FIG. 1.

In the fuse memory circuit 100E, the nodes that correspond to the test terminals TEST1 and TEST2 shown in FIG. 1 are grounded and the second transistors M12 and M22 are fixedly turned on. Furthermore, the node that corresponds to the program terminal PROG1 shown in FIG. 1 is grounded, and the first transistor M11 is fixedly turned off. The lock enable signal LOCKEN is input to the node that corresponds to the program terminal PROG2 shown in FIG. 1. When the program for the bit circuit 200 ends, the lock enable signal LOCKEN is asserted (H).

The output buffer 232 receives the outputs OUT1 and OUT2 of the first fuse unit 110E, and outputs these signals as the signal LOCK. The output buffer 232 may have the same configuration as that of the output buffer 220 shown in FIG. 10. In this case, the enable terminal EN shown in FIG. 10 may be grounded so as to fixedly turn on the transistor MP15. Also, the transistor MP15 may be omitted.

Before programming the fuse memory circuit 100E, both the two fuse elements F11 and F12 of the first fuse unit 110E are conductive. Accordingly, the two outputs OUT1 and OUT2 are each set to an intermediate electric potential. In this state, the two outputs (OUT, OUTB) of the output buffer 232 arranged as a downstream stage are both set to "L". Accordingly, the lock signal LOCK is set to "L".

After the completion of programming of the bit circuit 200, the manufacturer of the semiconductor apparatus 300 asserts the lock enable signal LOCKEN. This disconnects the fuse element F12 of the fuse memory circuit 100E. In this state, the fuse memory circuit 100E outputs OUT1="H" and OUT2="L". The lock signal LOCK, which is the output of the output buffer 232, is asserted (H).

With the lock circuit 230 shown in FIG. 11, after cutting the fuse element F12 (after programming), the steady-state current becomes zero. However, such a steady-state current flows before programming. Accordingly, in a case in which the first test (Ion test) is executed for the semiconductor apparatus 300 before programming the semiconductor apparatus 300, the measurement result involves an error due to the steady-state current in the lock circuit 230.

Figure 12:
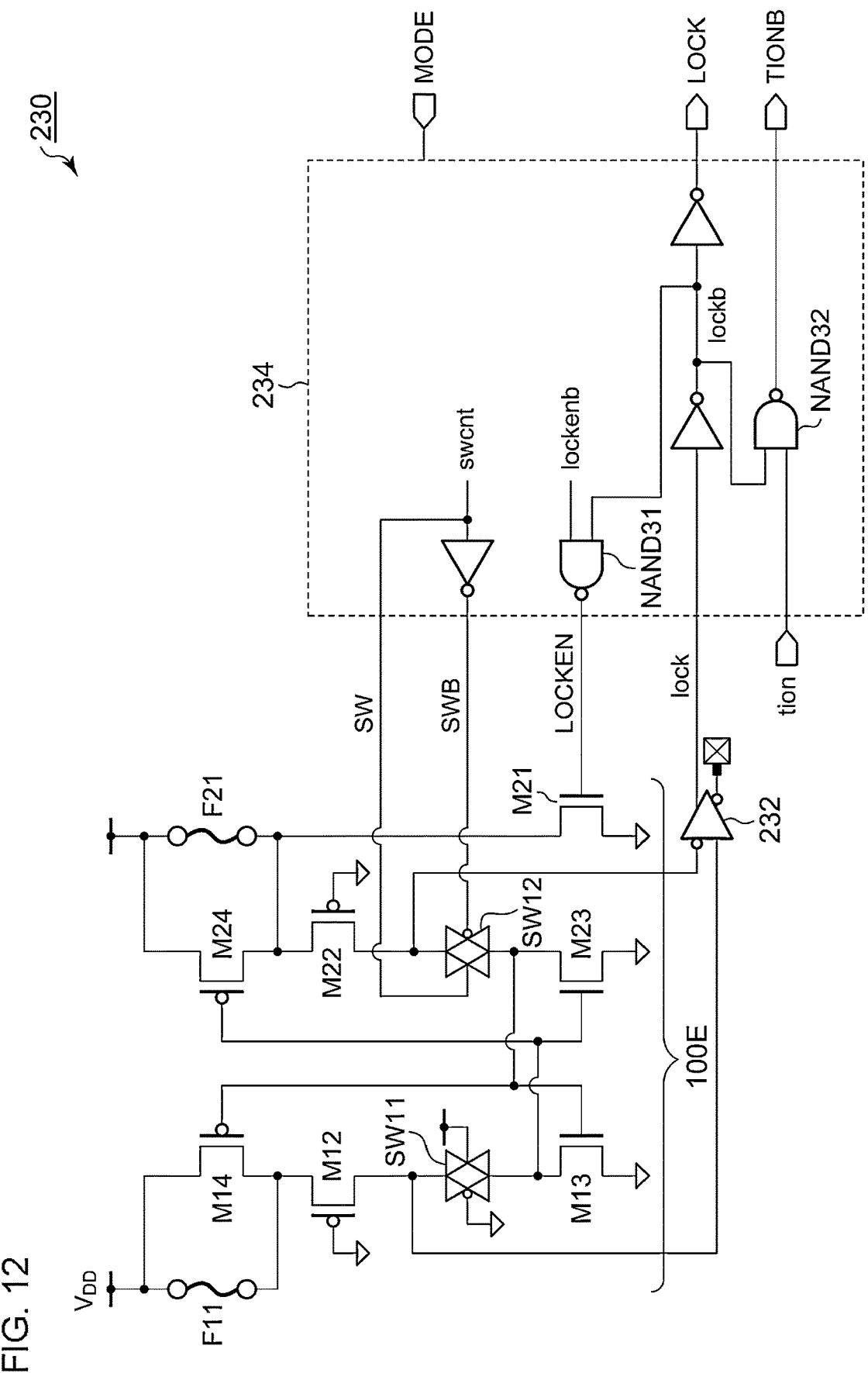
FIG. 12 is a circuit diagram showing another example configuration of the lock circuit.

FIG. 12 is a circuit diagram showing another example configuration of the lock circuit 230. A fuse memory circuit 100F shown in FIG. 12 includes two CMOS switches SW11 and SW21. The CMOS switch SW11 is fixedly set to the on state. The CMOS switch SW22 is switchable between the on state and the off state according to a control signal swent. When the first test is to be executed, the CMOS switch SW22 is turned off so as to cut off the through current in the fuse memory circuit 100F.

The control circuit 234 generates the lock enable signal LOCKEN and the control signals SW and SWB based on a mode signal MODE. The mode signal MODE is a flag that indicates whether the programming is before or after completion. The configuration of the control circuit 234 is not restricted in particular. The inverted lock enable signal lockenb is configured as an internal signal based on at least the MODE signal. The control circuit 234 includes a NAND gate NAND31. The control circuit 234 outputs the logical NAND of the inverted lock enable signal lockenb and the inverted lock signal lockb as the lock enable signal LOCKEN. After the lock signal lock is set to "H", the LOCKEN signal is fixed to "H". Furthermore, after the lock signal lock is set to "H" by the NAND gate NAND32, the TIONB signal is fixed to "H".

Figure 13:
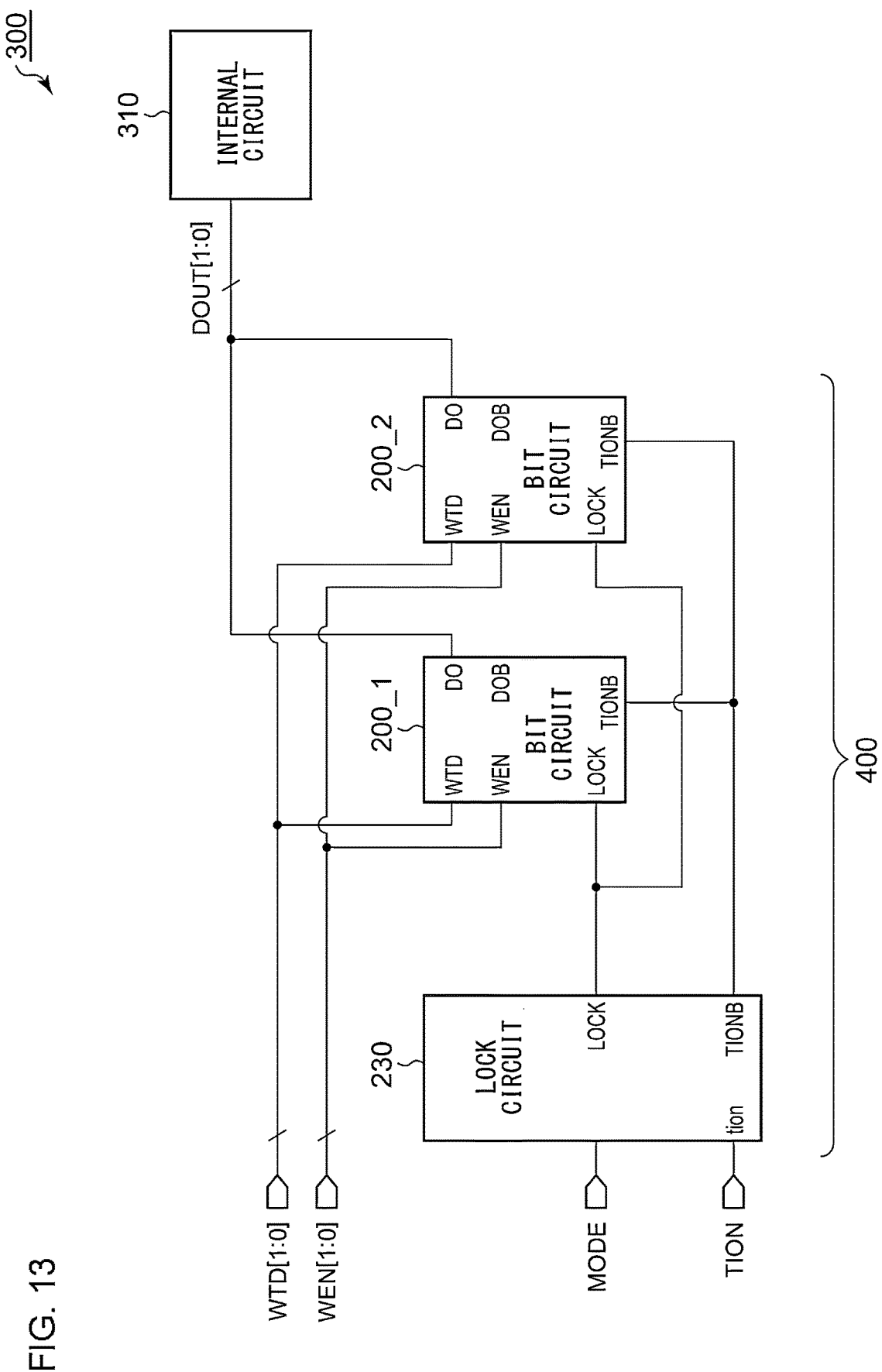
FIG. 13 is a block diagram showing an example configuration of a semiconductor apparatus.

FIG. 13 is a block diagram showing an example configuration of the semiconductor apparatus 300. The semiconductor apparatus 300 includes the lock circuit 230 in addition to multiple (two in this example) bit circuits 200_1 and 200_2 and the internal circuit 310. A combination of the bit circuits 200_1 and 200_2 and the lock circuit 230 will be referred to as a "fuse circuit" 400.

Lastly, description will be made regarding several specific examples of the semiconductor apparatus 300.

Figure 14:
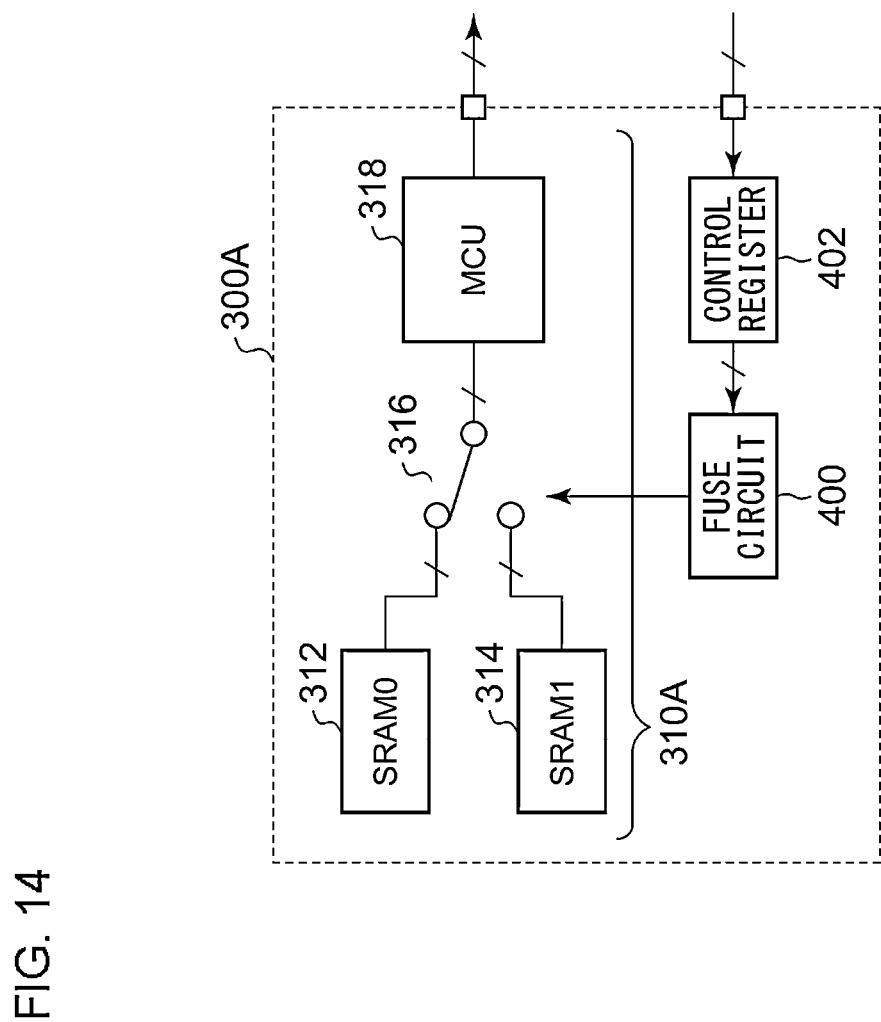
FIG. 14 is a block diagram showing an example of the semiconductor apparatus.

FIG. 14 is a block diagram showing an example (300A) of the semiconductor apparatus 300. An internal circuit 310A is configured as a digital circuit including static random access memory (SRAM) 312 and 314, a selector 316, and a microprocessor 318. The two units of SRAM 312 and 314 are provided so as to provide redundancy. The selector 316 selects one from among the two units of SRAM 312 and 314.

The fuse circuit 400 is controllable via a control register 402. The fuse circuit 400 can be programmed with control information for the selector 316. The microprocessor 318 is capable of accessing one from among the two units of SRAM 312 and 314 according to a value written to the fuse circuit 400. With this arrangement, by selecting the SRAM that is able to operate normally, this provides improved yield even in a case in which an abnormal state has been detected in one of the two units of SRAM 312 and 314 in a test process for the semiconductor apparatus 300A.

Figure 15:
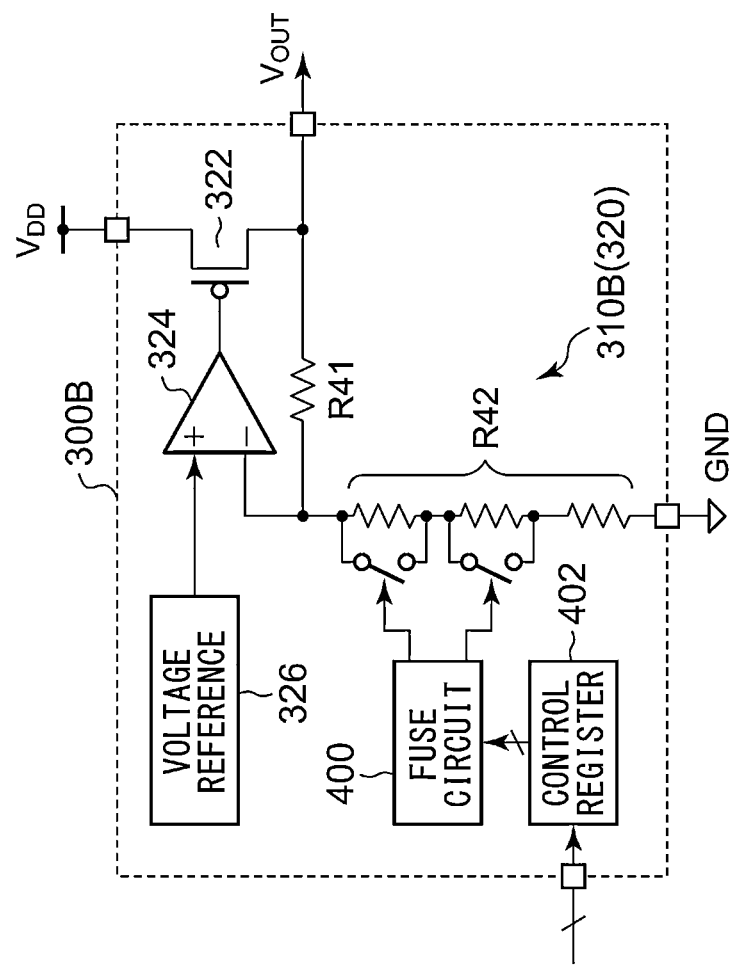
FIG. 15 is a diagram showing another example of the semiconductor apparatus.

FIG. 15 is a diagram showing another example (300B) of the semiconductor apparatus 300. An internal circuit 310B includes a linear regulator (Low Drop Output: LDO) 320. The linear regulator 320 includes a transistor 322, an operational amplifier 324, a reference voltage source 326, and resistors R41 and R42.

In this example, the resistor R42 is configured as a variable resistor, and the fuse circuit 400 is programmed with a setting value for the variable resistor. With this, such an arrangement is capable of adjusting the target value of the output voltage V OUT of the linear regulator 320.

Figure 16:
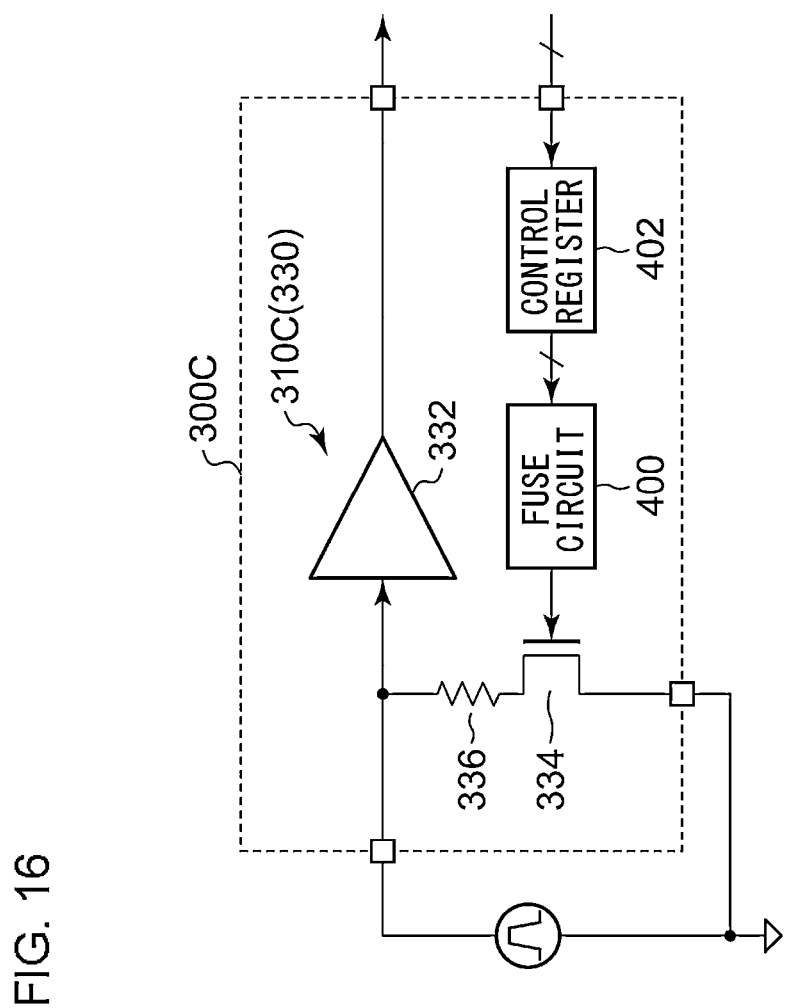
FIG. 16 is a diagram showing yet another example of the semiconductor apparatus.

FIG. 16 is a diagram showing yet another example (300C) of the semiconductor apparatus 300. An internal circuit 310C includes an interface circuit 330. The interface circuit 330 includes an input buffer 332, a pull-down resistor 336, and a switch 334. The fuse circuit 400 is programmed with a setting value of the on/off state of the switch 334. With this, the semiconductor apparatus 300C can be switched between a mode in which the input pin is used as a buffer input pin and a mode in which the input pin is pulled down.

The embodiments have been described for exemplary purposes only. It can be readily conceived by those skilled in this art that various modifications may be made by making various combinations of the aforementioned components or processes, which are also encompassed in the technical scope of the present disclosure, and which can also constitute an example of the present disclosure.

APPENDIX

An aspect of the present disclosure can be understood as follows.

Item 1

A fuse memory circuit comprising:
a first line being one of a power supply line and a ground line;
a second line being the other of the power supply line and the ground line;
a first fuse unit; and
a second fuse unit,
wherein the first fuse unit and the second fuse unit each comprise:
a test terminal;
a program terminal;
an output terminal;
a fuse element having a first end coupled to the first line;
a rectification element coupled in parallel with the fuse element;
a first transistor having a drain coupled to a second end of the fuse element, a source coupled to the second line, and a gate coupled to the program terminal;
a second transistor having a source coupled to the second end of the fuse element, a drain coupled to the output terminal, and a gate coupled to the test terminal; and
a third transistor having a drain coupled to the output terminal, and a source coupled to the second line,
wherein a gate of the third transistor of the first fuse unit is coupled to the output terminal of the second fuse unit,
and wherein a gate of the third transistor of the second fuse unit is coupled to the output terminal of the first fuse unit.

Item 2

The fuse memory circuit according to item 1, wherein the rectification element comprises a fourth transistor having a source coupled to the first end of the fuse element and a drain coupled to the second end of the fuse element.

Item 3

The fuse memory circuit according to item 2, wherein a gate of the fourth transistor is coupled to the gate of the third transistor.

Item 4

The fuse memory circuit according to item 3, wherein a relation $V_{DD} \times R_{M13}/(R_{FUSE}+R_{M12}+R_{M13}) > V_{TINV}$ holds true with a threshold voltage of a CMOS inverter circuit formed of the third transistor and the fourth transistor as $V_{TINV}$, with a resistance value of the fuse element before disconnection as $R_{FUSE}$, with a power supply voltage as $V_{DD}$, with an on resistance of the second transistor as $R_{M12}$, and with an on resistance of the third transistor as $R_{M13}$.

Item 5

The fuse memory circuit according to item 1, wherein the rectification element comprises a diode coupled in a direction with a cathode thereof as a high electric potential side and with an anode thereof as a low electric potential side.

Item 6

The fuse memory circuit according to any one of items 1 through 5, wherein the first line is structured as the power supply line, and the second line is structured as the ground line.

Item 7

The fuse memory circuit according to any one of items 1 through 5, wherein the first line is structured as the ground line, and the second line is structured as the power supply line.

Item 8

The fuse memory circuit according to any one of items 1 through 7, wherein the fuse element is structured as a fuse that is capable of being set to an electrically disconnected state by applying a current.

Item 9

The fuse memory circuit according to any one of items 1 through 7, wherein the fuse element is structured as an antifuse that is capable of being set to an electrically conductive state by applying a current.

Item 10

A semiconductor apparatus comprising the fuse memory circuit according to any one of items 1 through 9.

What is claimed is:

1. A fuse memory circuit comprising:
   a first line being one of a power supply line and a ground line;
   a second line being the other of the power supply line and the ground line;
   a first fuse unit; and
   a second fuse unit,
   wherein the first fuse unit and the second fuse unit each comprise:
      a test terminal;
      a program terminal;
      an output terminal;
      a fuse element having a first end coupled to the first line;
      a rectification element coupled in parallel with the fuse element;
      a first transistor having a drain coupled to a second end of the fuse element, a source coupled to the second line, and a gate coupled to the program terminal;
      a second transistor having a source coupled to the second end of the fuse element, a drain coupled to the output terminal, and a gate coupled to the test terminal; and
      a third transistor having a drain coupled to the output terminal, and a source coupled to the second line,
   wherein a gate of the third transistor of the first fuse unit is coupled to the output terminal of the second fuse unit,
   and wherein a gate of the third transistor of the second fuse unit is coupled to the output terminal of the first fuse unit.

2. The fuse memory circuit according to claim 1, wherein the rectification element comprises a fourth transistor having a source coupled to the first end of the fuse element and a drain coupled to the second end of the fuse element.

3. The fuse memory circuit according to claim 2, wherein a gate of the fourth transistor is coupled to the gate of the third transistor.

4. The fuse memory circuit according to claim 3, wherein a relation $V_{DD} \times R_{M13}/(R_{FUSE}+R_{M12}+R_{M13}) > V_{TINV}$ holds true with a threshold voltage of a CMOS inverter circuit formed of the third transistor and the fourth transistor as $V_{TINV}$, with a resistance value of the fuse element before disconnection as $R_{FUSE}$, with a power supply voltage as $V_{DD}$, with an on resistance of the second transistor as $R_{M12}$, and with an on resistance of the third transistor as $R_{M13}$.

5. The fuse memory circuit according to claim 1, wherein the rectification element comprises a diode coupled in a direction with a cathode thereof as a high electric potential side and with an anode thereof as a low electric potential side.

6. The fuse memory circuit according to claim 1, wherein the first line is the power supply line, and the second line is the ground line.

7. The fuse memory circuit according to claim 1, wherein the first line is the ground line, and the second line is the power supply line.

8. The fuse memory circuit according to claim 1, wherein the fuse element is structured as a fuse that is capable of being set to an electrically disconnected state by applying a current.

9. The fuse memory circuit according to claim 1, wherein the fuse element is structured as an antifuse that is capable of being set to an electrically conductive state by applying a current.

10. A semiconductor apparatus comprising the fuse memory circuit according to claim 1.

* * * * *